United States Patent [19]

Kurai et al.

[11] Patent Number: 5,315,421
[45] Date of Patent: May 24, 1994

[54] RUBBING APPARATUS INCLUDING DOUBLE REFRACTION PHASE DIFFERENCE MEASURING MEANS AND MANUFACTURING METHOD FOR LIQUID CRYSTAL DISPLAY DEVICE

[75] Inventors: Hisako Kurai, Amagasaki; Hideaki Mochizuki, Osaka; Shinya Kosako, Neyagawa, all of Japan

[73] Assignee: Matsushita Electric Industrial Co., Ltd., Osaka, Japan

[21] Appl. No.: 53,200

[22] Filed: Apr. 28, 1993

[30] Foreign Application Priority Data

Apr. 28, 1992 [JP] Japan .................... 4-109462
Sep. 21, 1992 [JP] Japan .................... 4-251020

[51] Int. Cl.$^5$ .................... G02F 1/1335; G02F 1/1337
[52] U.S. Cl. .......................... 359/76; 359/62
[58] Field of Search ................. 359/76, 78, 62

[56] References Cited

U.S. PATENT DOCUMENTS 3,744,920  7/1973  Adams et a. .................... 359/82

FOREIGN PATENT DOCUMENTS 3-248126  11/1991  Japan .
4-152323   5/1992  Japan .................... 359/76

OTHER PUBLICATIONS

"The Mechanism of polymer alignment of liquid-crystal materials", Geary et al., J. Appl. Phys. 62(10), 15 Nov. 1987, pp. 4100-4108.

Primary Examiner—Anita P. Gross
Attorney, Agent, or Firm—Wenderoth, Lind & Ponack

[57] ABSTRACT

An apparatus for measuring the double refractive phase difference of an orientation film formed on an electrode substrate is disclosed. The apparatus provided with a laser generating two linearly polarized beams having optical electric fields perpendicular to each other and to the direction of the propagation, beam splitter for splitting the light transmitted through the substrate into two, detectors for detecting a component of 45° to the x-y plane included in one of the two splitted lights and a component in the x or y direction included in the other splitted light and calculation circuit for calculating the double refractive phase difference of an orientation film based on detected values of these two components. The rubbing conditions are controlled in accordance with the double refractive phase difference measured.

6 Claims, 2 Drawing Sheets

RUBBING APPARATUS INCLUDING DOUBLE REFRACTION PHASE DIFFERENCE MEASURING MEANS AND MANUFACTURING METHOD FOR LIQUID CRYSTAL DISPLAY DEVICE

BACKGROUND OF THE INVENTION

1. Field of the Invention

The present invention relates to a rubbing apparatus for orientating a film formed on a transparent electrode of a liquid crystal display device, and a method for manufacturing liquid crystal display devices with using the rubbing apparatus.

2. Description of the Prior Art

A manufacturing method of a liquid crystal display device in the prior art will be first depicted hereinbelow.

A conventional rubbing apparatus is constituted of a fixing stage for fixing a transparent electrode substrate having an orientation film (alignment polymer) formed on the surface thereof, and a movable part which moves and rotates a drum with a cloth of rayon, nylon, cotton or the like wound therearound along the fixing stage. When an orientation film is to be rubbed by the rubbing apparatus, after such conditions as the rotating frequency cf the rubbing roller (rotary drum), moving speed of the substrate, pressing amount to the orientation film (pressing force), etc. are preliminarily set, the orientation film on the surface of a transparent electrode substrate is brought in touch with the rubbing cloth of the rotating rubbing roller, thereby to rub the orientation film (Japanese Patent Laid-Open Publication Tokkaisho No. 55-143525 (143525/1980)).

In the conventional rubbing method as above, it is quite difficult to set the rubbing conditions and it is hard to uniformly rub the orientation film because the distance between the surface of the orientation film and the rubbing roller with the rubbing cloth (that is, pressing amount of the rubbing roller against the orientation film), the revolution number of the roller, the moving speed of the substrate of the diameter of the roller may be varied even after these rubbing conditions are set. The surface of the orientation film would be flawed (rubbing flaw) in the worst case.

If a liquid crystal display device is constituted by using the flawed transparent electrode substrate, since the substrate at the part of the flaw acts in a different manner to the electric field, an abnormal area of a threshold value is generated along the flaw. Even if the orientation film is rubbed on condition that the rotating frequency of the roller, moving speed of the substrate, pressing amount to the film, and the diameter of the roller are constant, namely, when the rubbing conditions are kept constant, it is not sure that the orientation film is rubbed with the constant rubbing strength at all times, due to the change of the thickness of the glass substrate, the difference per lot of the rubbing cloth, the change with time of the mechanical accuracy, etc. Although it is not completely made clear how the liquid crystal molecules are orientated by rubbing, generally, it is so considered that the polymer chains in the vicinity of the surface of the orientation film are orientated when the shearing force is applied to the surface of the orientation film through rubbing, and the liquid-crystal molecules are aligned in the direction of the orientation of the polymer chains. Therefore, the orientation state of the surface of the orientation film works important influences upon the orientation of the liquid crystal molecules. Although a double refraction method (J.M. Geary, J.W. Goodby, A.R. Kmetz and J.S. Petel, J. Appln. Phys., Vol. 62, No. 10 (1987)) is known as a method to quantitatively measure the orientation state of the rubbed orientation film, there has been no proposal yet to measure a large area at many points with high speeds. Moreover, the suitable orientation state has not been determined for the rubbed orientation film. In the absence of a sufficient evaluating method of the orientating stage before assembling of a liquid crystal display panel, it is impossible to detect whether or not the rubbing is performed well before the panel is actually assembled, thereby increasing the number of defective products. In other words, when the rubbing state of the orientation film is not uniform within the substrate surface, the pre-tilt angle of the liquid crystal molecules is changed, and consequently the threshold value becomes irregular, that is, the display irregularity (color irregularity) is caused in the panel, resulting in the deterioration of the display quality.

SUMMARY OF THE INVENTION

The object of the present invention is therefore to provide a rubbing apparatus for liquid crystal display devices which can measure a large area of an orientation film at many points with high speeds, and a manufacturing method of liquid crystal display devices using the rubbing apparatus whereby the rubbing conditions of an orientation film are controlled based on the measured refraction phase difference of the rubbed orientation film.

A manufacturing method of liquid crystal display devices of the present invention is constituted of a rubbing means for rubbing an orientation film formed on a transparent electrode substrate, a double refraction phase difference measuring means for measuring the double refraction phase difference of the orientation film, and a rubbing controlling means for controlling the rubbing means based on the measuring result of the double refraction phase difference.

According to the manufacturing method as above, even when the thickness distribution of the orientation film is changed or the neighboring circumstances are changed, it is possible to stably secure a suitable double refraction phase difference in the constant range to the orientation film without being influenced by the above change. When the rubbing apparatus of the present invention is used, both the size and the direction of the double refraction can be measured in a large area of a to-be-measured object at many points with high speeds without necessities for rotating the object. Moreover, since the rubbing apparatus generates measuring beams of different diameters, it becomes possible not only to evaluate the uniformity and the rubbing strength within the plane of the double refraction phase difference of the orientation film by using the measuring beam of a large spot diameter, for example, approximately 2 mm and, but to finely measure the surface of the rubbed orientation film by using the measuring beam of a small spot diameter, e.g., 0.2 mm. Therefore, the surface defect of the orientation film after rubbing (rubbing flaw), etc. can be detected exactly. The present invention realizes a liquid crystal display panel of high display quality orientated with the uniform pre-tilt angle without a stripe of rubbing flaws. The yield of the liquid crystal display devices is greatly improved.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals and in which.

DETAILED DESCRIPTION OF THE PREFERRED EMBODIMENTS

A manufacturing method of liquid crystal display devices according to one preferred embodiment of the present invention will be discussed with reference to the accompanying drawings. In the first place, a rubbing apparatus used in the present manufacturing method will be depicted hereinbelow.

Figure 1:
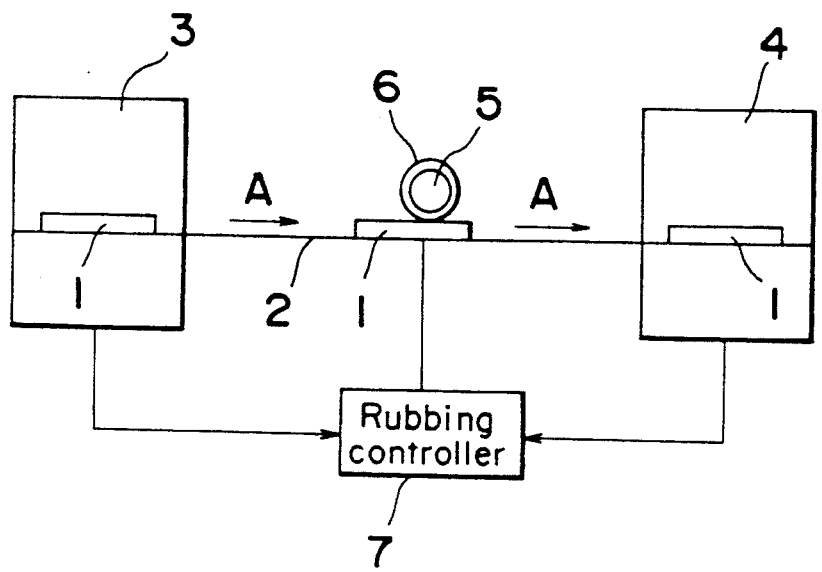
FIG. 1 is a schematic structural diagram of a rubbing apparatus for liquid crystal display devices according to one preferred embodiment of the present invention.

FIG. 1 schematically shows the structure of an orientating apparatus used in a manufacturing method of the present invention, in which reference numerals 1 through 7 represent respectively: a transparent electrode substrate, a transfer belt, a first chamber, a second chamber, a rubbing roller, a rubbing cloth, and a rubbing controlling section. As shown in FIG. 1, the transfer belt 2 of the orientating apparatus transfers the transparent electrode substrates 1, each having an orientation film (alignment polymer) formed thereon, sequentially from the first chamber 3 to the second chamber 4 at a constant speed for every predetermined interval. Between the first and second chambers 3 and 4 is arranged the rubbing roller 5 with the rubbing cloth 6, which is rotated with a constant revolution number by a rubbing roller driving motor (not shown in FIG. 1). The orientation film is wholly rubbed as the rubbing cloth 6 is in touch with the orientation film on the transparent electrode substrate 1 in accordance with the rotation of the rubbing roller 5 and the movement of the transparent electrode substrate 1. The rubbing conditions at this time, namely, the revolution number of the rubbing roller 5, the moving speed of the transparent electrode substrate 1 and the pressing force (pressing amount) of the rubbing cloth 6 against the orientation film are suitably controlled for every substrate by the rubbing controlling section 7.

The first and second chambers 3 and 4 of the above orientating apparatus respectively provided for measuring the double refraction phase difference of the orientation film before rubbing and after rubbing may be formed in the same structure.

Figure 2:
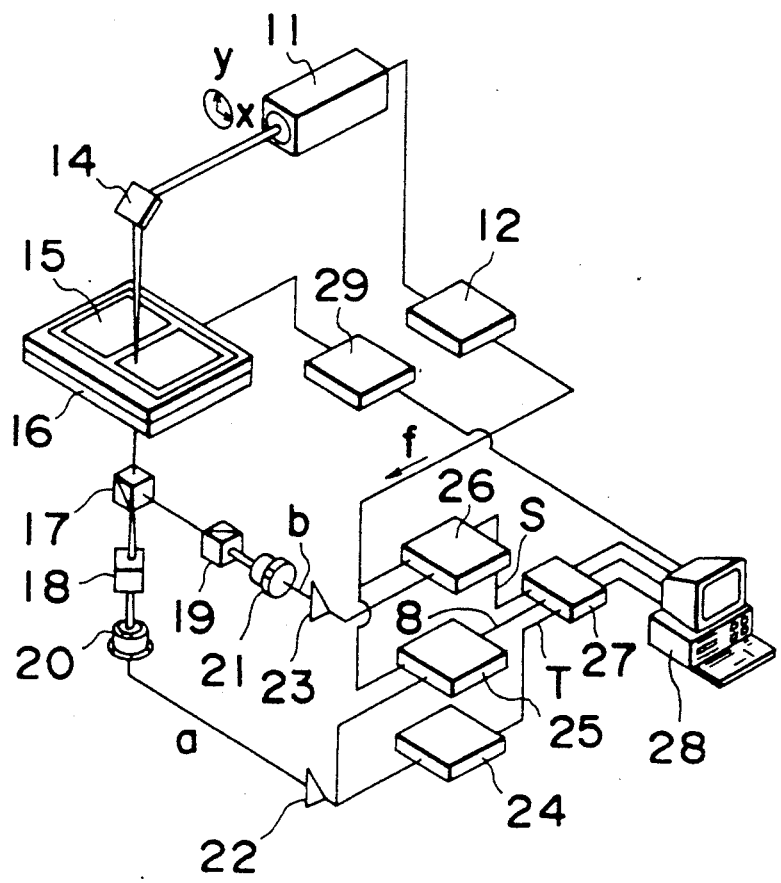
FIGS. 2 and 3 are schematic structural diagrams of a double refraction phase difference measuring means of the rubbing apparatus of FIG. 1.

FIG. 2 shows a double refraction phase difference measuring means.

As indicated in FIG. 2, the double refraction phase difference measuring means uses an oscillation frequency stabilized He-N Zeeman laser 11 (referred to as a laser hereinafter) as a light source. The laser 11 generates a linearly polarized light of f1 frequency which is propagated in the z-axis direction, having en electric field directed in the x-axis direction, and a linearly polarized light of f2 frequency which is propagated in the z-axis direction with an electric field directed in the y-axis direction. When a magnetic field is applied to a laser tube of the laser 11, the energy level thereof is slightly shifted because of the Zeeman effect and therefore, the laser 11 emits laser lights with f1 and f2 frequencies. Since the difference f between f1 and f2 should be stabilized, the cavity length of the laser 11 is controlled to make the difference f constant. For controlling the cavity length, the temperature is kept constant by using a fan, or a piezoelectric element is provided in a resonator mirror. Generally, f is in the range from 100 KHz to several MHz.

A controller 12 of the laser 11 outputs a reference beat signal of a frequency equal to the difference frequency f. The laser light is condensed on a target substrate 15 (to-be-measured object) by a mirror 14. The target substrate 15 (transparent electrode substrate) can be moved in x and y directions by an xy stage 16. The light passing through the transparent electrode substrate 15 is separated to two by a non-polarization beam splitter 17 which is a splitting means to split both lights of f1 and f2 frequencies. One of the light passes through an analyzer 18 which allows only the polarized component 45° to the x-axis to pass through, and is detected by a photodetector 20. The other light is detected by a photodetector 21 through an analyzer 19 which allows only the component polarized in the x-axis or y-axis direction (the light advances in the z-axis direction). The photodetectors 20, 21 detect signals changing in accordance with the transmittance, the amount of the double refraction and the direction of the delayed phase axis cf the target substrate 15. An output a of the photodetector 20 passes, via a preamplifier 22, through a low pass filter 24 which detects only a direct current component T and a lock-in amplifier 25 which outputs a product q of an alternating current component and the reference signal f. On the other hand, an output b of the photodetector 21 produces a product s of an alternating current component and the reference signal f at a lock-in amplifier 26 through a preamplifier 23. These signals T, q and s are A/D converted in an A/D converter 27 and then sent to a computer 28. The computer 28 has an operating part to obtain the amount of the double refraction and the direction of the delayed phase axis from the signals T, q and s. The rubbing conditions determined on the basis of the difference between the double refraction phase differences before and after rubbing of the orientation film (the double refraction phase difference of only the orientation film resulting from rubbing) which is operated at the operating part is fed to the rubbing controlling section 7 of FIG. 1. The rubbing controlling section 7 in turn controls the revolution number of the rubbing roller 5, moving speed of the transparent electrode substrate 1 and the pressing amount of the rubbing cloth 6 so as to make the difference of the double refraction phase differences before and after rubbing to be a predetermined constant value. The computer 28 generates a control signal to control the xy stage 16 via an xy controller 29.

The operation of the orientating apparatus in the above-described structure will be depicted with reference to FIG. 1. The transparent electrode substrate 1 before rubbing is transferred to the first chamber 3, where the double refraction phase difference of the transparent electrode substrate 1 and the orientation film before rubbing is measured by the double refraction phase difference measuring means of FIG. 2. Thereafter, the transparent electrode substrate 1 is carried on the transfer belt 2 at a constant speed and rubbed in a predetermined direction by the rotating rubbing cloth 6. The transparent substrate 1 having the thus-rubbed orientation film is then sent into the second chamber 4. The double refraction phase difference of the sum of the transparent substrate 1 and the orientation film after rubbing is measured in the second chamber 4 in the same manner as in the first chamber 3. The difference of the double refraction phase differences of the orientation film before and after rubbing (double refraction phase difference of only the orientation film resulting from rubbing) is calculated by the calculating means. The result is fed back to the rubbing controlling section 7. Accordingly, the rubbing controlling section 7 controls the revolution number of the rubbing roller 5, the moving speed of the transparent electrode substrate 1 and the pressing amount of the rubbing cloth 6 so that the difference of the double refraction phase differences before and after rubbing (double refraction phase difference of the orientation film by rubbing) is within a predetermined range.

In the above-described manner, the difference of the double refraction phase differences before and after rubbing of the transparent electrode substrate 1 (double refraction phase difference of the orientation film as a result of rubbing) is measured (calculated in the computation process). The suitable rubbing condition at the rubbing time of the transparent electrode substrate 1 is set based on the difference of the double refraction phase differences before and after rubbing for each of the transparent electrode substrates 1 continuously transferred on the belt 2. It is also possible to set the suitable rubbing condition for a next transparent electrode substrate to be rubbed based on the double refraction phase difference of the precedent substrate after rubbing.

Figure 3:
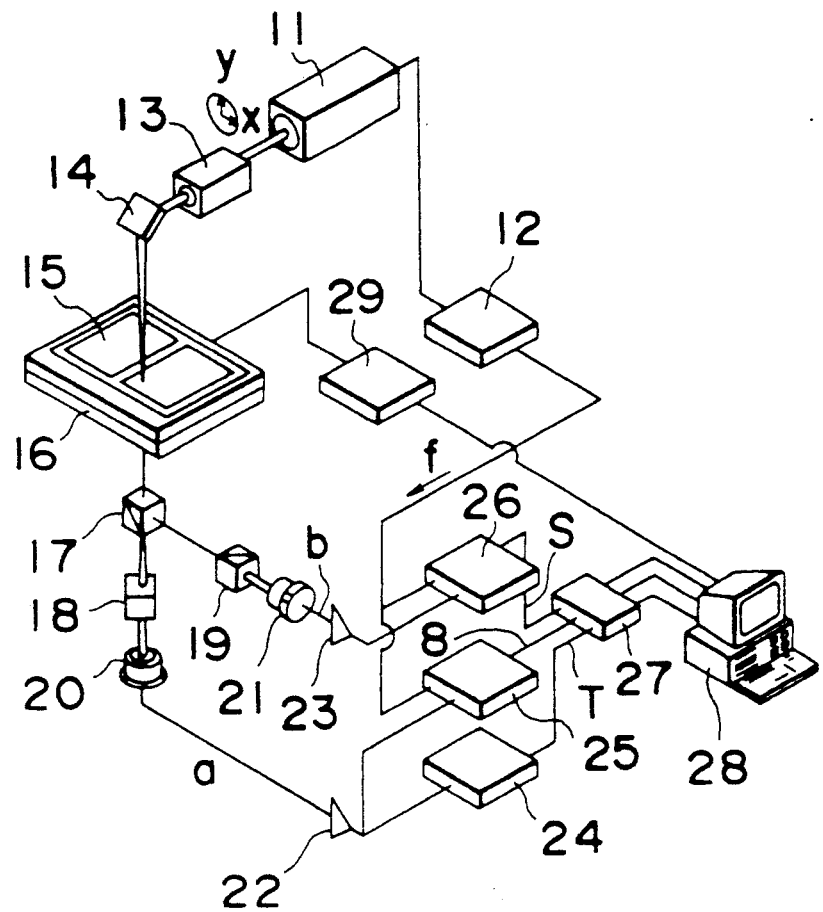

Although the first and second chambers 3, 4 are separate and independent of each other in the above embodiment, the first and second chambers may be connected at an appropriate common section, or may be constructed to be used in common. Moreover, the rubbing apparatus may be equipped with a laser for emitting laser beams of different spot diameters as shown in FIG. 3. In this case, the spot diameter is switched by an optical system 13 so that the light is condensed on the transparent electrode substrate 15 to be measured. According to the preferred embodiment, the spot diameter is adapted to be switched to approximately 0.2 mm by a condenser lens and approximately 2 mm without using the condenser lens. However, the spot diameter is not restricted to above approximately 2 mm and 0.2 mm. The laser light may be switched to two or more spot diameters. The optical system may also be constructed in a different manner.

Figure 4:
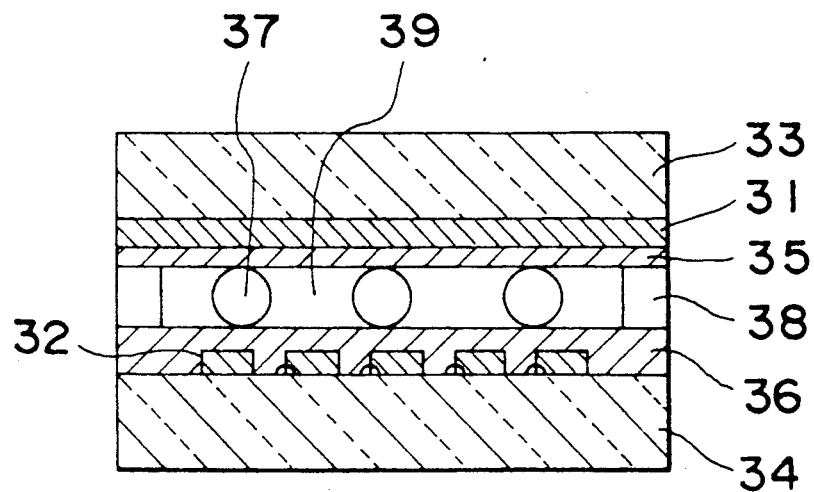
FIG. 4 is a fundamental sectional view of a liquid crystal display device for explaining a manufacturing method thereof according to a preferred embodiment of the present invention.

An embodiment of a manufacturing method of liquid crystal display devices using the aforementioned rubbing apparatus will be discussed hereinbelow. FIG. 4 is a fundamental sectional view of a liquid crystal display device for explaining the manufacturing method of the present invention. 400 scanning electrodes 31 and 640 display electrodes 32 made of indium oxide including tin (ITO) are formed in the upper and lower transparent electrode plates 33, 34, respectively. The transparent electrode substrates 33, 34, each 25×16 cm square, are cleaned and a resin material (for instance, SE610 of Nissan Chemicals Inc.) as a polyimide resin layer is printed on the substrates 33, 34 through thermal polymerization. Then, after the substrates are dried for 10 minutes at 80° C., the substrates are hardened at 250° C. for one hour, thereby to form approximately 70 nm thick polyimide orientation films 35, 36. The substrates are rubbed by the orientating apparatus of the present invention indicated in FIG. 1 in such a direction that the twisting angle of liquid crystal molecules becomes 240°. At this time, the transparent electrode substrates 33, 34 are measured with the laser beams of spot diameters 2 mm and 0.2 mm. The surface of each orientation film 35, 36 is measured at 100 points with an equal distance using the laser light of 2 mm spot diameter, and then the spot diameter is changed to 0.2 mm to finely measure the surface of the orientation films 35, 36 to inspect the presence/absence of a physical damage on the surface. The difference of double refraction phase differences before and after rubbing measured with the laser light of 2 mm spot diameter (double refraction phase difference generated in the orientation film consequent to rubbing) and the evaluating result of the presence/absence of a noticeable damage o the surface of the orientation films with use of the laser light of 0.2 mm spot diameter are shown in Table 1 below.

TABLE 1

| Panel No. | Scanning electrode substrate | | Display electrode substrate | | Display quality of panel |
|---|---|---|---|---|---|
| | Double refraction phase difference (Δnd) nm | Presence/absence of flaw | Double refraction phase difference (Δnd) nm | Presence/absence of flaw | |
| 1 | 1.21 | absent | 1.22 | absent | o |
| 2 | 1.25 | absent | 1.21 | absent | o |
| 3 | 1.18 | absent | 1.27 | absent | Δ |
| 4 | 1.19 | absent | 1.21 | absent | o |
| 5 | 1.20 | absent | 1.20 | absent | o |
| 6 | 1.21 | absent | 1.22 | absent | o |
| 7 | 1.21 | absent | 1.19 | absent | o |
| 8 | 1.23 | absent | 1.20 | absent | o |
| 9 | 1.21 | absent | 1.20 | absent | o |
| 10 | 1.22 | absent | 1.21 | absent | o |
| 11 | 1.20 | absent | 1.19 | absent | o |
| 12 | 1.20 | absent | 1.21 | absent | o |
| 13 | 1.21 | absent | 1.21 | absent | o |
| 14 | 1.20 | absent | 1.19 | absent | o |
| 15 | 1.23 | absent | 1.20 | absent | o |
| 16 | 1.22 | absent | 1.22 | absent | o |
| 17 | 1.20 | absent | 1.22 | absent | o |
| 18 | 1.21 | absent | 1.20 | absent | o |
| 19 | 1.22 | absent | 1.21 | absent | o |
| 20 | 1.23 | absent | 1.20 | absent | o |
| 21 | 1.21 | absent | 1.19 | absent | o |
| 22 | 1.25 | absent | 1.21 | absent | o |
| 23 | 2.43 | present | 1.22 | absent | x |
| 24 | 1.20 | absent | 1.20 | absent | o |
| 25 | 1.24 | absent | 1.19 | absent | o |
| 26 | 1.21 | absent | 1.22 | absent | o |
| 27 | 1.22 | absent | 1.20 | absent | o |
| 28 | 1.19 | absent | 1.21 | absent | o |
| 29 | 1.20 | absent | 1.22 | absent | o |
| 30 | 1.23 | absent | 1.20 | absent | o |

N.B. Δnd is the average of 100 points.

The transparent electrode substrates 33, 34 are bonded each other thereby to obtain a liquid crystal display device. More specifically, beads are scattered on the transparent electrode substrate 33 to form bead spacers 37, while a sealing agent as a seal resin 38 is printed on the other transparent electrode substrate 34. Then, the substrates 34, 34 are bonded. The sealing agent is of a thermosetting type, which is set for four hours at 60° C., and subsequently for three hours at 150° C. Thereafter, a commercially available STN liquid crystal composition 39 is vacuum injected. The liquid crystal display device is thus completed.

Samples of liquid crystal display devices are obtained in the above manufacturing method, and driven with 1/200 duty cycle to study the display quality. The evaluating result of the liquid crystal display devices are marked by o, Δ and x in Table 1 above. That is, mark o means that the display quality is good without the display irregularity or a rubbing flaw on the display surface, mark Δ indicates that the display quality is bad accompanying the noticeable display irregularity, rubbing flaws, etc., and mark x represents considerably bad display quality with many defects such as the display irregularity, rubbing flaws and the like.

For comparison purpose, comparative liquid crystal display devices are manufactured in the same manner as in the present embodiment, except that a conventional rubbing apparatus having a rubbing means alone is used. The measuring light has approximately 2 mm spot diameter. The difference of the double refraction phase differences before and after rubbing (double refraction phase difference of only the orientation film generated by rubbing) and the evaluating result of the display quality of the liquid crystal display devices are shown in Table 2.

TABLE 2

| Panel No. | Scanning electrode substrate Double refraction phase difference (Δnd) nm | Display electrode substrate Double refraction phase difference (Δnd) nm | Display quality of panel |
|---|---|---|---|
| 1 | 1.70 | 1.00 | x |
| 2 | 1.20 | 1.30 | o |
| 3 | 1.00 | 1.20 | Δ |
| 4 | 1.30 | 1.20 | o |
| 5 | 1.10 | 1.30 | o |
| 6 | 1.20 | 1.00 | o |
| 7 | 1.00 | 1.10 | o |
| 8 | 1.20 | 1.00 | o |
| 9 | 1.20 | 1.00 | o |
| 10 | 1.10 | 1.21 | o |
| 11 | 1.50 | 0.85 | x |
| 12 | 1.50 | 1.02 | Δ |
| 13 | 1.20 | 1.12 | o |
| 14 | 1.00 | 1.21 | o |
| 15 | 1.00 | 1.11 | o |
| 16 | 1.10 | 1.21 | o |
| 17 | 1.30 | 1.20 | o |
| 18 | 0.80 | 1.50 | Δ |
| 19 | 1.20 | 1.21 | o |
| 20 | 1.00 | 1.20 | o |
| 21 | 1.20 | 1.10 | o |
| 22 | 1.10 | 1.00 | o |
| 23 | 1.20 | 1.31 | o |
| 24 | 1.30 | 1.30 | o |
| 25 | 1.30 | 1.20 | o |
| 26 | 1.50 | 0.90 | x |
| 27 | 1.30 | 1.20 | o |
| 28 | 1.10 | 1.11 | o |
| 29 | 1.50 | 1.02 | Δ |
| 30 | 1.20 | 1.10 | o |

N.B. Δnd is the average of 100 points.

As is made clear from Table 2 above, the difference of double refraction phase differences before and after rubbing is varied for each transparent electrode substrate when the conventional rubbing apparatus is used, and consequently the display quality of the liquid crystal devices is variously changed. In contrast, when the rubbing apparatus of the present invention is used, as is shown in Table 1, a constant double refraction phase difference is achieved stably in the orientation film, making it possible to realize a liquid crystal display device of high display quality. Moreover, the rubbing flaw (which is turned to be a defect in the panel) can be almost perfectly detected before the transparent electrode substrates are bonded with each other. Further, the measuring time is reduced to approximately 1/150 when the double refraction phase difference measuring means of the present invention is employed, as compared with a conventional measuring means.

The manufacturing method according to the present invention is not limited to manufacturing of STN liquid crystal display devices, but, widely applicable to general liquid Crystal display devices. It does not matter if the orientation film is formed by the other method than printing. Besides, the transparent electrode substrates may be coated with an undercoat or an overcoat upon necessities.

The liquid crystal display device obtained according to the present invention shows high display quality because the amount of the double refraction is regulated within a suitable range as the evaluating parameter of the orientating state of the rubbed orientation film. This aspect of the invention will be depicted in detail with reference to FIG. 4. It is to be noted that the retardation (Δnd) is represented by the amount of the double refraction.

25×16 cm square upper and lower glass substrates 33, 34 have 400 scanning electrodes 31 and 640 display electrodes 32 formed of indium oxide including tin (ITO), respectively. After the glass substrates 33, 34 are cleaned, a polyamic acid resin layer or a polypyromellitic acid resin layer which will be described below is formed by printing. The using solution is of a kind to turn the resin layer to a polyimide resin layer through thermal polymerization, specifically, SE150, SE610 by Nissan Chemicals Inc. and PSI-A-2101, PSI-A-2201 by Chisso Petro-Chemicals Inc. are used. After printing, the substrates are dried for 10 minutes at 80° C. The substrates using SE150, SE610 are set for one hour at 250° C. and those using PSI-A-2101, PSI-A-2201 are set for two hours at 200° C., whereby 50 nm–70 nm thick polyimide orientation films are formed. The orientation films 35, 36 are rubbed in a manner so that the amount of the double refraction after rubbing becomes approximately 1.0 nm and in a direction so that the twisting angle of the liquid crystal molecules is 240° while the rotating frequency of the roller with a rayon cloth and the moving speed of the substrates are set constant, whereas the pressing amount is changed for every kind of the orientation films. Thereafter, the transparent electrode substrates 33, 34 are bonded thereby to obtain a liquid crystal display device. At this time, beads are scattered on the transparent electrode substrate 33 to form bead spacers 37, and a sealant as a seal resin 38 is printed on the other transparent electrode substrate 34. The sealant is set by heat for four hours at 60° C. and then for three hours at 150° C. Subsequently, an STN liquid crystal composition 39 which is commercially available is vacuum injected, thus completing the panel. The liquid crystal display device of 1/200 duty cycle is thus manufactured, which is classified as a group 1.

In the meantime, the other orientation films using SE150, SE610, PSI-A-2101, PSI-A-2201 are rubbed so that the amount of the double refraction after rubbing is approximately 0.5 nm, 1.5 nm, 2.0 nm, 0.2 nm, 2.3 nm, 0.1 nm while the pressing amount is changed for every kind of the orientation films. Then, the obtained panels are classified into groups 2, 3, 4, 5, 6, 7 depending on the amount of the double refraction, namely, 0.5 nm, 1.5 nm, 2.0 nm, 0.2 nm, 2.3 nm, 0.1 nm. The display quality when the panels in groups 1-7 are driven with 1/200 duty cycle is indicated in Table 3 by mark o, mark Δ and mark x. Specifically, mark o indicates the panel of good display quality without the display irregularity or rubbing flaw on the display surface, mark Δ shows the panel of low display quality with the conspicuous display irregularity or rubbing flaw on the display surface, while mark x is the panel of considerably poor display quality having the display irregularity and many rubbing flaws on the surface.

TABLE 3

| Orientation film | Amount of double refraction (Δnd) | | | | | | |
|---|---|---|---|---|---|---|---|
| | 0.1 nm | 0.2 nm | 0.5 nm | 1.0 nm | 1.5 nm | 2.0 nm | 2.3 nm |
| SE150 | x | o | o | o | o | o | Δ |
| SE610 | x | o | o | o | o | o | Δ |
| PSI-A-2101 | x | o | o | o | o | o | x |
| PSI-A-2201 | x | o | o | o | o | o | x |

N.B. Δnd is the average of 100 points.

As is described hereinabove, according to the present invention, since the amount of the double refraction is used as the evaluating parameter of the orientating state thereby to control rubbing of the orientation film in the suitable range, a liquid crystal display panel of good display quality is obtained. In the present invention, since the amount of the double refraction after rubbing of an STN aliphatic polyimide orientation film is controlled in the range of about 0.2 nm-2.0 nm, a liquid crystal display panel of excellent quality is obtained. Since the rubbing strength is weak if the amount of the double refraction is approximately 0.1 nm, the orientation is incompletely achieved, resulting in the display irregularity on the display surface. On the other hand, when the amount of the double refraction is 2.3 nm, the rubbing strength is too much, thereby to deteriorate the display quality with the rubbing flaw generated on the display surface. The orientation film is preferably polyimide from the viewpoints of the applicability, rubbing easiness, orientation regulating properties and chemical stability.

The orientation film may not be formed by printing, and the other forming method is employable. Moreover, the display panel may be coated with an undercoat or an overcoat. It is an important feature of the present invention that the orientation film is rubbed in a manner to hold the amount of the double refraction after rubbing in the suitable range, whereby a liquid crystal display device of good display quality is obtained.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A rubbing apparatus for liquid crystal display devices which is provided with a rubbing means for rubbing an orientation film formed on a transparent electrode substrate of a liquid crystal display device, a double refraction phase difference measuring means for measuring at least the double refraction phase difference of said orientation film after rubbing, and a rubbing controlling means for controlling said rubbing means on the basis of the measured result of the double refraction phase difference, wherein said double refraction phase difference measuring means consists of a light source which generates a first linearly polarized laser light with f1 frequency propagating in the z-axis direction with the optical electric field directed in the x-axis direction and a second linearly polarized laser light with f2 frequency propagating in the z-axis direction with the optical electric field directed in the y-axis direction, a difference frequency generating means for generating an alternating current signal f of a difference frequency f=f1-f2, a light splitting means for splitting the laser light passing through said substrate with the orientation film at an approximately constant ratio irrespective of the direction of polarization, a multiplicator which obtains products q and s of said difference frequency alternating current signal f with a signal a detected when one of the split lights is received by a photodetector through an analyzer which allows only a component substantially 45° to the x and y axes to pass through and a signal b detected when the other split light is received by a photodetector through an analyzer which allows only a component substantially in the x-axis or y-axis direction to pass through, respectively and a calculation means for calculating the amount of the double refraction d of said substrate with the orientation film and the direction of a delayed phase axis (or an advanced phase axis) based on the output of said multiplicator.

2. The rubbing apparatus of liquid crystal display devices according to claim 1, wherein said double refraction phase difference measuring means provides means for adjusting the spot diameter of said laser light.

3. A manufacturing method of a liquid crystal display device having two electrode substrates, each with a transparent electrode layer and a rubbed orientation film sequentially formed in this order on a base, disposed in confronting relation to each other,
   comprising steps of
   rubbing said orientation film formed on said electrode substrate,
   irradiating said electrode substrate with the rubbed orientation film with first and second linearly polarized laser beams having optical electric fields perpendicular to each other and to the direction of their propagation,
   splitting light transmitted through said electrode substrate with the rubbed orientation film into two,
   detecting a component substantially 45° to the x and y axes included in one of the split lights and a component in the x-axis or y-axis direction included in the other split light,
   calculating the double refraction phase difference of said rubbed thin film, based on the detected values, and
   controlling the next rubbing operation by setting rubbing conditions based on the double refraction phase difference calculated.

4. The manufacturing method according to claim 3 wherein the rubbing conditions are controlled so that the amount of the double refraction after rubbing is in the range of 0.2 nm to 2 nm.

5. The manufacturing method according to claim 4, wherein said orientation film is an organic high polymer film of polyimide.

6. The manufacturing method according to claim 4, whereby a nematic liquid crystal having a 120°-290° twist angle of liquid crystal molecules is interposed between said confronting substrates.

* * * * *